(12) United States Patent
Bugos et al.

(10) Patent No.: US 8,347,605 B2
(45) Date of Patent: Jan. 8, 2013

(54) AUTOMOTIVE DIESEL EXHAUST HC DOSING VALVE FOR USE WITH DIESEL PARTICULATE FILTER SYSTEMS

(75) Inventors: Stephen Bugos, Poquoson, VA (US); Michael J. Hornby, Williamsburg, VA (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 1081 days.

(21) Appl. No.: 11/811,122

(22) Filed: Jun. 7, 2007

(65) Prior Publication Data
US 2008/0022668 A1   Jan. 31, 2008

Related U.S. Application Data

(63) Continuation-in-part of application No. 11/504,148, filed on Aug. 15, 2006.

(60) Provisional application No. 60/708,195, filed on Aug. 15, 2005, provisional application No. 60/828,305, filed on Oct. 5, 2006.

(51) Int. Cl.
*F01N 3/00* (2006.01)

(52) U.S. Cl. .............. 60/286; 60/295; 60/297; 60/303; 60/311

(58) Field of Classification Search .............. 60/286, 60/295, 297, 299, 303, 311
See application file for complete search history.

(56) References Cited

U.S. PATENT DOCUMENTS

| | | | | |
|---|---|---|---|---|
| 2,310,350 A | * | 2/1943 | Bovard | 137/868 |
| 4,282,896 A | * | 8/1981 | Makino | 137/495 |
| 5,090,625 A | * | 2/1992 | Davis | 239/453 |
| 5,273,020 A | | 12/1993 | Hayami | |
| 5,519,993 A | * | 5/1996 | Rao et al. | 60/288 |
| 5,709,080 A | | 1/1998 | Arora | |
| 6,666,389 B2 | * | 12/2003 | Ito et al. | 239/585.1 |
| 6,685,112 B1 | | 2/2004 | Hornby | |
| 6,912,846 B2 | | 7/2005 | Huber et al. | |
| 7,032,376 B1 | * | 4/2006 | Webb et al. | 60/297 |
| 7,065,958 B2 | * | 6/2006 | Funk et al. | 60/286 |

FOREIGN PATENT DOCUMENTS

| | | |
|---|---|---|
| EP | 1176292 A1 | 1/2002 |
| EP | 1211396 * | 6/2002 |
| EP | 1211396 A2 | 6/2002 |

* cited by examiner

*Primary Examiner* — Thomas Denion
*Assistant Examiner* — Diem Tran

(57) ABSTRACT

A dosing valve assembly is disclosed for administering a reducing agent into an exhaust stream from an internal combustion engine upstream of a catalytic converter and diesel particulate filter. The dosing valve assembly includes a control valve coupled to a source of reducing agent, a delivery valve constructed and arranged for coupling to the exhaust stream to enable a quantity of reducing agent to be administered into the exhaust stream, and an elongated conduit connecting the control valve and delivery valve for fluidly communicating reducing agent from the control valve to the fuel delivery valve. The disclosed arrangement enables the control valve to be displaced from the delivery valve and thus away from the high temperature environment proximal to the exhaust stream.

13 Claims, 4 Drawing Sheets

AUTOMOTIVE DIESEL EXHAUST HC DOSING VALVE FOR USE WITH DIESEL PARTICULATE FILTER SYSTEMS

CROSS REFERENCE TO RELATED APPLICATIONS

This application is a continuation-in-part and claims the benefit of U.S. application Ser. No. 11/504,148, filed Aug. 15, 2006, which claims the benefit of U.S. Provisional Application Ser. No. 60/708,195, filed Aug. 15, 2005, both entitled "Automotive Diesel Exhaust HC Dosing Valve," the contents of which are hereby incorporated by reference herein.

This application further claims the benefit of U.S. Provisional Application Ser. No. 60/828,305, filed Oct. 5, 2006, entitled "Diesel Particulate Filter Systems," the contents of which are hereby incorporated by reference herein.

FIELD OF THE INVENTION

The present invention relates generally to a system for reducing particulates and nitric oxide ($NO_x$) emissions by diesel engines, and more particularly, to a novel hydrocarbon (HC) dosing valve system that eliminates the requirement for water cooling in a high temperature environment.

BACKGROUND OF THE INVENTION

Hydrocarbons and $NO_x$ emissions are a direct result of the combustion process in an internal combustion engine. To reduce such harmful emissions, catalytic converters are employed to reduce their toxicity. For gasoline engines, "three-way catalysts" are used to reduce nitrogen oxides to nitrogen and oxygen ($2NO_x \rightarrow xO_2 + N_2$), oxidize carbon monoxide to carbon dioxide ($2CO + O_2 \rightarrow 2CO_2$); and oxidize hydrocarbons to carbon dioxide and water: $C_xH_y + nO_2 \rightarrow xCO_2 + mH_2O$. In the case of compression ignition or "Diesel" engines, the most commonly employed catalytic converter is the diesel oxidation catalyst. This catalyst employs excess $O_2$ in the exhaust gas stream to oxidize carbon monoxide to carbon dioxide and hydrocarbons to water and carbon dioxide. These converters virtually eliminate the typical odors associated with diesel engines, and reduce visible particulates, however they are not effective in reducing $NO_x$ due to excess oxygen in the exhaust gas stream.

Another problem prevalent with diesel engines is the generation of particulates (soot). This is reduced through what is commonly referred to as a soot trap or diesel particulate filter (DPF). The catalytic converter itself is unable to affect elemental carbon in the exhaust stream. The DPF is either installed downstream of the catalytic converter, or incorporated within the catalytic converter itself. A clogged DPF can create undesired backpressure on the exhaust stream and thereby reduce engine performance. To alleviate this problem, the DPF can undergo a regeneration cycle when diesel fuel is injected via a dosing valve directly into the exhaust stream and the soot is burned off. The injection of diesel fuel can be stopped after the regeneration cycle is complete.

$NO_x$ emissions in the exhaust from a diesel engine can be reduced by employing a Selective Catalytic Reduction Catalyst (SCR) in the presence of a reducing agent such as ammonia ($NH_3$). Existing technologies utilize SCR and $NO_x$ traps or $NO_x$ absorbers. The ammonia is typically stored on board a vehicle either in pure form, either as a liquid or gas, or in a bound form that is split hydrolytically to release the ammonia into the system.

An aqueous solution of urea is commonly used as a reducing agent. The urea is stored in a reducing tank coupled to the system. A dosing valve is disposed on the exhaust carrying structure upstream of the catalytic converter to meter the delivery of a selected quantity of urea into the exhaust stream. When the urea is introduced into the high temperature exhaust, it is converted to a gaseous phase and the ammonia is released to facilitate reduction of $NO_x$. In lieu of ammonia, diesel fuel from the vehicle's fuel supply can be used as the reducing agent. In this expedient, a quantity of diesel fuel is administered directly into the exhaust via the dosing valve.

In either case, the dosing valve is mounted in close proximity to the exhaust, and thus operates in a harsh environment where temperatures can reach as high as 600 deg C. Accordingly, the dosing valve must be cooled to prevent decomposition or crystallization of the urea prior to delivery into the exhaust stream, and to maintain the integrity of the valve assembly. To alleviate this problem, prior art expedients have employed water cooling systems for the valve assembly. However, water cooling requires specialized plumbing and additional components that ultimately increase costs and reduce reliability.

SUMMARY OF THE INVENTION

In view of the foregoing, it is an object of the invention to provide a dosing valve assembly for an internal combustion engine that eliminates the need for water cooling of the dosing valve.

It is a further object of the invention to provide a dosing valve assembly which utilizes a control valve that is separated from a delivery valve mounted on the exhaust carrying structure to remove the control valve from the high temperature environment proximal to the exhaust stream.

It is yet another object of the invention to provide a dosing valve assembly in accordance with the above that can be utilized to provide both SCR for a catalytic converter and regeneration for a DPF.

In accordance with aspects of the invention, a dosing valve assembly is disclosed for administering a reducing agent, such as for example, diesel fuel, into an exhaust stream from an internal combustion engine upstream of a catalytic converter and DPF. The dosing valve assembly comprises a control valve coupled to a source of the reducing agent, a delivery valve constructed and arranged for coupling to the exhaust stream at a location upstream of the catalytic converter and DPF to enable a quantity of reducing agent to be administered into the exhaust stream, and an elongated conduit connecting the control valve and delivery valve for fluidly communicating the reducing agent from the control valve to the delivery valve. The disclosed arrangement enables the control valve to be displaced from the delivery valve and away from the high temperature environment proximal to the exhaust stream.

In accordance with one aspect of the invention, the control valve comprises an electronic fuel injector coupled to a source of the reducing agent, and the delivery valve comprises a poppet valve. The fuel injector is coupled to an electronic control unit that signals the fuel injector to permit or inhibit the flow of reducing agent to the poppet valve in response to various sensed parameters.

These and other advantages of the invention will be apparent to those of ordinary skill in the art by reference to the following detailed description and the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
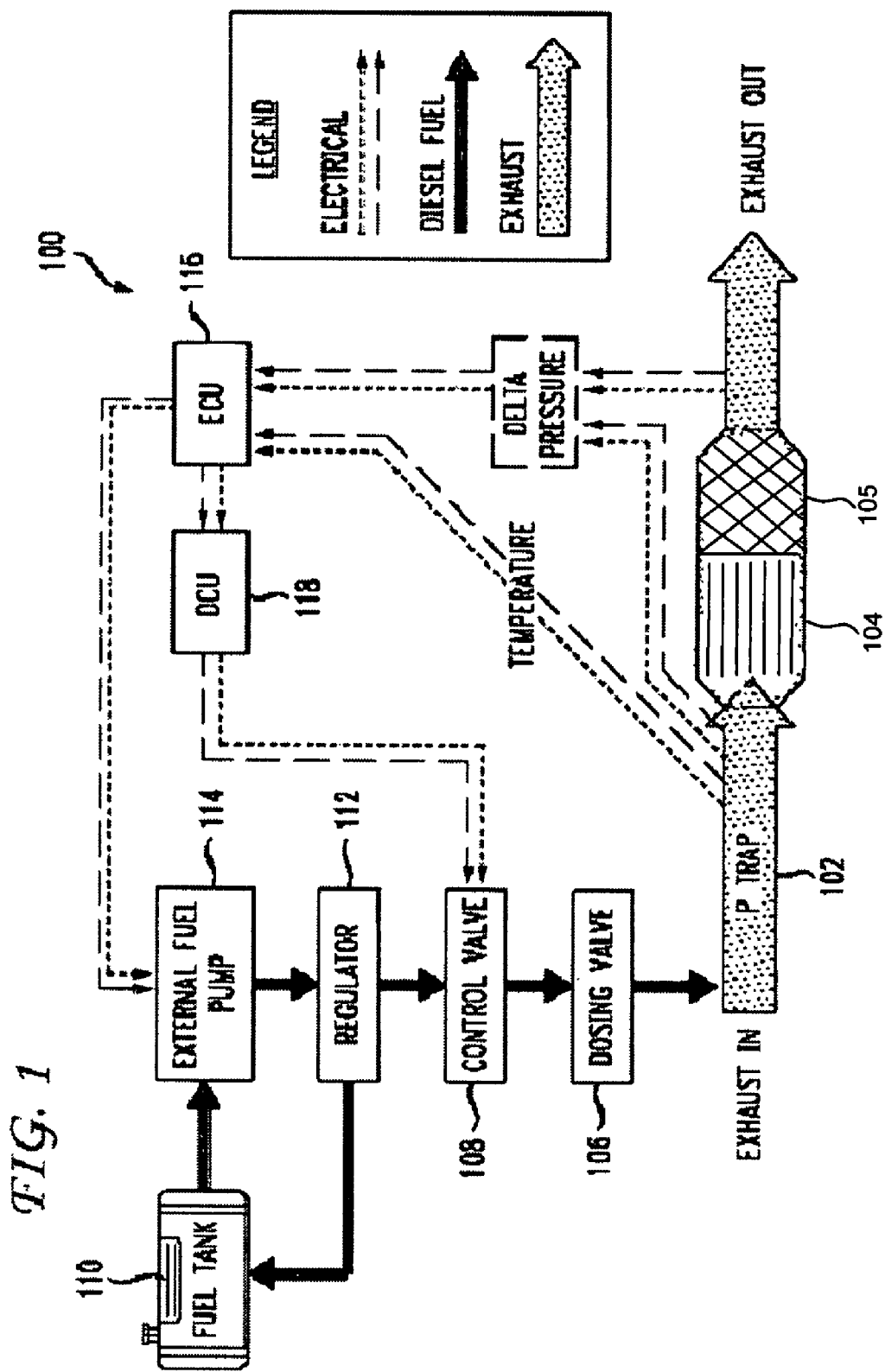
FIG. 1 is a schematic of an illustrative dosing system.

Referring to FIG. 1, there is depicted a system schematic of an exemplary dosing system 100. Exhaust from a diesel engine (not shown) is communicated through an exhaust pipe 102 including a P-trap, which is coupled to a catalytic converter 104 and diesel particulate filter (DPF) 105. The catalytic converter 104 is of the SCR type that is well known in the art, which utilizes a selective catalytic reduction method to reduce the $NO_x$ content in the exhaust stream. The DPF 105 is shown schematically as being part of the catalytic converter 104. However, it will be understood by those skilled in the art that the DPF may be a separate unit disposed downstream of the catalytic converter 104. A reducing agent, such as diesel fuel in the exemplary embodiment, is introduced into the exhaust pipe via a dosing valve 106 that is physically attached to pipe 102. The diesel fuel injected via the dosing valve upstream of the catalytic converter 104 acts both as the reducing agent for the SCR process, and to support the regeneration cycle in the DPF to clean the filter.

The dosing valve 106 fluidly communicates with a control valve 108 that is disposed away from manifold 102. The details of the dosing valve 106 and control valve 108 assembly are described in detail below. The control valve 106 receives a supply of diesel fuel that is stored in a fuel tank 110 via a pressure regulator 112. A fuel pump 114 supplies diesel fuel under pressure from tank 110 to regulator 112. The fuel pump 114 and the control valve 108 are electrically coupled to an electronic control unit (ECU) 116. A dosing control unit (DCU) 118 is disposed between ECU 116 and control valve 108. These components are operative to meter a quantity of diesel fuel that is injected into the exhaust stream to reduce the $NO_x$ content in the exhaust stream. The reduction is effectuated by introducing a desired quantity of diesel fuel upstream of catalytic converter 104. Pressure sensors are disposed upstream and downstream of catalytic converter 104 to enable these parameters to be communicated to ECU 116 as schematically depicted in FIG. 1. In addition, temperature sensors and $NO_x$ sensors electrically communicate with ECU 116 as is known in the art. The ECU 116 monitors various parameters including temperature, pressure and $NO_x$ content in the exhaust stream and consequently meters the introduction of diesel fuel into the exhaust stream to optimize the reduction of undesirable particulates and $NO_x$ emissions.

Figure 2:
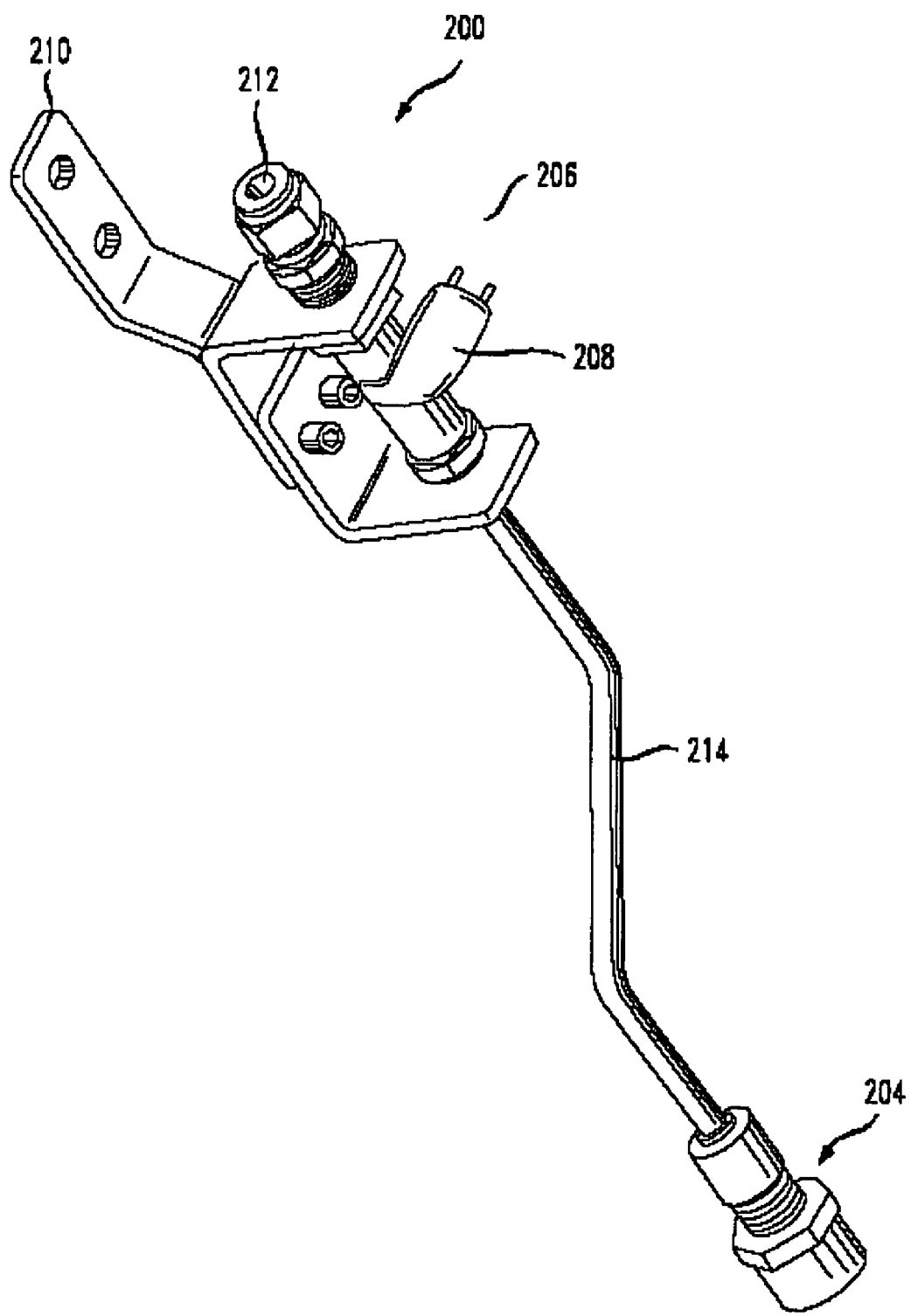
FIG. 2 is a schematic of a dosing valve assembly in accordance with an aspect of the invention.

FIG. 2 is a schematic of a dosing valve assembly 200, which generally comprises a control valve assembly 202 and poppet valve assembly 204. The control valve assembly 202 includes a fuel injector 206 that, for this application, has been modified to omit an orifice disk that atomizes a fuel charge that is delivered to an internal combustion engine in the usual manner. The fuel injector 206 is described in greater detail below. In general terms, the fuel injector 206 comprises an electronic connector 208 that couples fuel injector 206 to the ECU 116 and DCU 118 as described above and depicted in FIG. 1. The fuel injector 206 is disposed on a bracket 210 for mounting the assembly within the vehicle. A fuel inlet 212 on a first end of the fuel injector 206 receives a supply of diesel fuel from fuel tank 110 (FIG. 1). The fuel injector 206 is fluidly coupled to poppet valve assembly 204 through a connecting tube 214, which has a length sufficient to displace the control valve assembly 202 from the high temperature environment in proximity to the exhaust stream. The poppet valve assembly 204 is mounted directly on the exhaust structure and described in further detail below.

Figure 3:
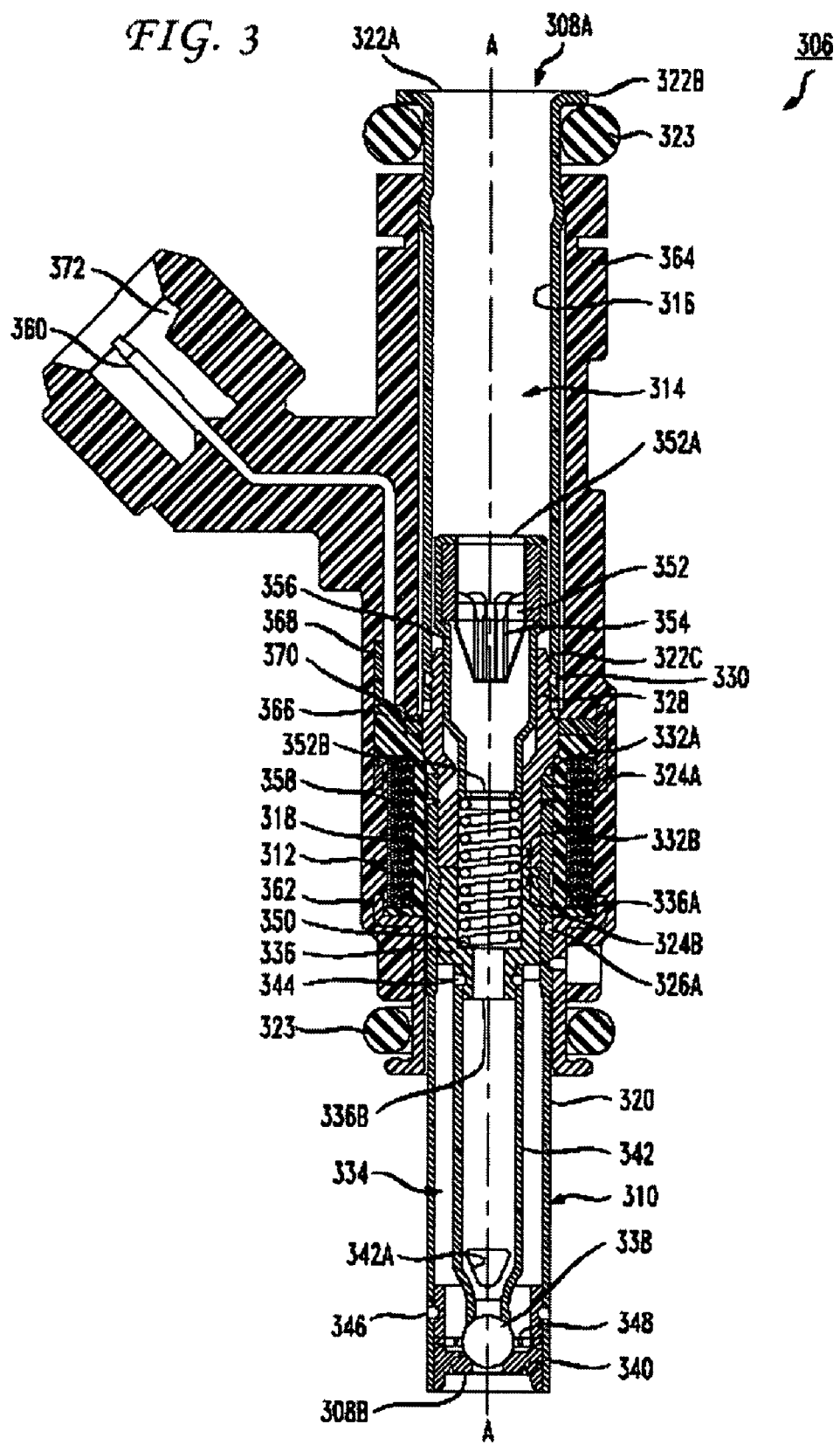
FIG. 3 is a schematic of an exemplary control valve in the dosing valve assembly in accordance with another aspect of the invention.

FIG. 3 is a schematic an exemplary fuel injector 306 (corresponding to 206 in FIG. 2), that may be used as a control valve for the present invention. Fuel injector 306 extends along a longitudinal axis A-A between a first injector end 308A and a second injector end 308B, and includes a valve group subassembly 310 and a power group subassembly 312. The valve group subassembly 310 performs fluid handling functions, e.g., defining a fuel flow path and prohibiting fuel flow through the injector 306. The power group subassembly 312 performs electrical functions, e.g., converting electrical signals to a driving force for permitting fuel flow through the injector 306.

The valve group subassembly 310 includes a tube assembly 314 extending along the longitudinal axis A-A between the first fuel injector end 308A and the second fuel injector end 308B. The tube assembly 314 can include at least an inlet tube 316, a non-magnetic shell 318, and a valve body 320. The inlet tube 316 has a first inlet tube end 322A proximate to the first fuel injector end 308A. The inlet tube 316 can be flared at the inlet end 322A into a flange 322B to retain an O-ring 323. A second inlet tube end 322C of the inlet tube 316 is connected to a first shell end 324A of the non-magnetic shell 318. A second shell end 324B of the non-magnetic shell 318 can be connected to a generally transverse planar surface of a first valve body end 326A of the valve body 320. A second valve body end 326B of the valve body 320 is disposed proximate to the second tube assembly end 308B. A separate pole piece 328 can be connected to the inlet tube 316 and connected to the first shell end 324A of the non-magnetic shell 318. The pole piece may comprise a stainless steel material such as SS 430FR (ASTM A838-00). The non-magnetic shell 318 can comprise non-magnetic stainless steel, e.g., 300-series stainless steels such as SS 305 (EN 10088-2), or other materials that have similar structural and magnetic properties.

As shown in FIG. 3, inlet tube 316 is attached to pole piece 328 by weld bead 330. Formed into the outer surface of pole piece 328 are pole piece shoulders 332A, which, in conjunction with mating shoulders of a bobbin of the coil subassembly, act as positive mounting stops when the two subassemblies are assembled together. The inlet tube 316 can be attached to the pole piece 328 at an inner circumferential surface of the pole piece 328. Alternatively, an integral inlet tube and pole piece can be attached to the inner circumferential surface of a non-magnetic shell 318.

An armature assembly 334 is disposed in the tube assembly 314. The armature assembly 334 includes a first armature assembly end having a ferromagnetic or armature portion 336 and a second armature assembly end having a sealing portion. The armature assembly 334 is disposed in tube assembly 314 such that a shoulder 336A of armature 336 confronts a shoulder 332B of pole piece 328. The sealing portion can include a closure member 338, e.g., a spherical valve element, that is moveable with respect to the seat 340 and its sealing surface 340A. The closure member 338 is movable between a closed configuration (depicted in FIG. 3) and an open configuration (not shown). In the closed configuration, the closure member 338 contiguously engages the sealing surface 340A to prevent fluid flow through the opening. In the open configuration, the closure member 338 is spaced from the seat 340 to permit fluid flow through the opening. The armature assembly 334 may also include a separate intermediate portion 342 connecting the ferromagnetic or armature portion 336 to the closure member 338. The intermediate portion or armature tube 342 may be attached to armature 336 and closure member 338 by weld beads 344, 346, respectively.

Surface treatments can be applied to at least one of the end portions 332B and 336A to improve the armature's response, reduce wear on the impact surfaces and variations in the working air gap between the respective end portions 332B and 336A. The surface treatments can include coating, plating or case-hardening. Coatings or platings can include, but are not limited to, hard chromium plating, nickel plating or keronite coating. Case hardening on the other hand, can include, but is not limited to, nitriding, carburizing, carbo-nitriding, cyaniding, heat, flame, spark or induction hardening.

Fuel flow through the armature assembly 334 is facilitated by at least one axially extending through-bore 336B and at least one aperture 342A through a wall of the armature assembly 334. The apertures 342A, which can be of any shape, are preferably non-circular, e.g., axially elongated, to facilitate the passage of gas bubbles. The apertures 342A provide fluid communication between the at least one through-bore 336B and the interior of the valve body 320. Thus, in the open configuration, fuel can be communicated from the through-bore 336B, through the apertures 342A and the interior of the valve body 320, around the closure member 338, and through outlet end 308B of injector 306.

In another embodiment, a two-piece armature having an armature portion directly connected to a closure member can be utilized. Although both the three-piece and the two-piece armature assemblies are interchangeable, the three-piece armature assembly is preferable due to its ability to reduce magnetic flux leakage from the magnetic circuit of the fuel injector 306. It will be appreciated by those skilled in the art that the armature tube 342 of the three-piece armature assembly can be fabricated by various techniques, for example, a plate can be rolled and its seams welded or a blank can be deep-drawn to form a seamless tube.

In the case of a spherical valve element providing the closure member 338, the spherical valve element can be connected to the armature assembly 334 at a diameter that is less than the diameter of the spherical valve element. Such a connection is on the side of the spherical valve element that is opposite and contiguous contact with the seat 340. A lower armature assembly guide 348 can be disposed in the tube assembly 314, proximate the seat 340, and slidingly engages the diameter of the spherical valve element. The lower armature assembly guide 348 facilitates alignment of the armature assembly 334 along the longitudinal axis A-A.

A resilient member 350 is disposed in the tube assembly 314 and biases the armature assembly 334 toward the seat 340. A filter assembly 352 comprising a filter 354 and a preload adjuster 356 is also disposed in the tube assembly 314. The filter assembly 352 includes a first filter assembly end 352A and a second filter assembly end 352B. The filter 354 is disposed at one end of the filter assembly 352 and also located proximate to the first end 308A of the tube assembly 314 and apart from the resilient member 350 while the preload adjuster 356 is disposed generally proximate to the second end of the tube assembly 314. The preload adjuster 356 engages the resilient member 350 and adjusts the biasing force of the member 350 with respect to the tube assembly 314. In particular, the preload adjuster 356 provides a reaction member against which the resilient member 350 reacts in order to close the injector 306 when the power group subassembly 312 is de-energized. The position of the preload adjuster 356 can be retained with respect to the inlet tube 316 by an interference press-fit between an outer surface of the preload adjuster 356 and an inner surface of the tube assembly 314. Thus, the position of the preload adjuster 356 with respect to the inlet tube 316 can be used to set a predetermined dynamic characteristic of the armature assembly 334.

The power group subassembly 312 comprises an electromagnetic coil 358, at least one terminal 360, a coil housing 362, and an overmold 364. The electromagnetic coil 358 comprises a wire that that can be wound on a bobbin 314 and electrically connected to electrical contacts 368 on the bobbin 314. When energized, the coil 358 generates magnetic flux that moves the armature assembly 334 toward the open configuration, thereby allowing the fuel to flow through the opening. De-energizing the electromagnetic coil 358 allows the resilient member 350 to return the armature assembly 334 to the closed configuration, thereby shutting off the fuel flow. The housing, which provides a return path for the magnetic flux, generally includes a ferromagnetic cylinder surrounding the electromagnetic coil 358 and a flux washer 370 extending from the cylinder toward the axis A-A. The flux washer 370 can be integrally formed with or separately attached to the cylinder. The coil housing 362 can include holes, slots, or other features to break-up eddy currents that can occur when the coil 358 is energized.

The overmold 364 maintains the relative orientation and position of electromagnetic coil 358, the at least one terminal 360, and the coil housing 362. The overmold 364 includes an electrical harness connector 370 portion in which a portion of the terminal 360 is exposed. The terminal 360 and the electrical harness connector portion 372 can engage a mating connector, e.g., part of a wiring harness (not shown), to facilitate connecting injector 306 to ECU 116 (FIG. 1) for energizing the electromagnetic coil 358.

According to a preferred embodiment, the magnetic flux generated by electromagnetic coil 358 flows in a circuit that includes pole piece 328, armature assembly 334, valve body 320, coil housing 306, and flux washer 370. The magnetic flux moves across a parasitic air gap between the homogeneous material of the magnetic portion or armature 336 and valve body 320 into the armature assembly 334 and across a working air gap between end portions 332B and 336A towards the pole piece 328, thereby lifting closure member 338 away from seat 340.

In an illustrative embodiment, wire is wound onto a pre-formed bobbin 366 having electrical connector portions 368 to form a bobbin assembly. The bobbin assembly is inserted into a pre-formed coil housing 362. To provide a return path for the magnetic flux between the pole piece 328 and the coil housing 362, flux washer 370 is mounted on the bobbin assembly.

In operation, the electromagnetic coil 358 is energized, thereby generating magnetic flux in the magnetic circuit. The magnetic flux moves armature assembly 334 (along the axis A-A, according to a preferred embodiment) towards the integral pole piece 328, closing the working air gap. Such movement of the armature assembly 334 separates the closure member 338 from the seat 340 and allows fuel to flow from the fuel tank 110 (FIG. 1), through inlet tube 368, throughbore 336B, apertures 342A and valve body 320, thereafter between seat 340 and closure member 338, through the opening, and finally through the outlet end 308B and into connecting tube 214 (FIG. 2). When the electromagnetic coil 358 is de-energized, the armature assembly 334 is biased by the resilient member 350 to contiguously engage closure member 338 against seat 340, thereby blocking fluid flow through the injector 306.

Figure 4:
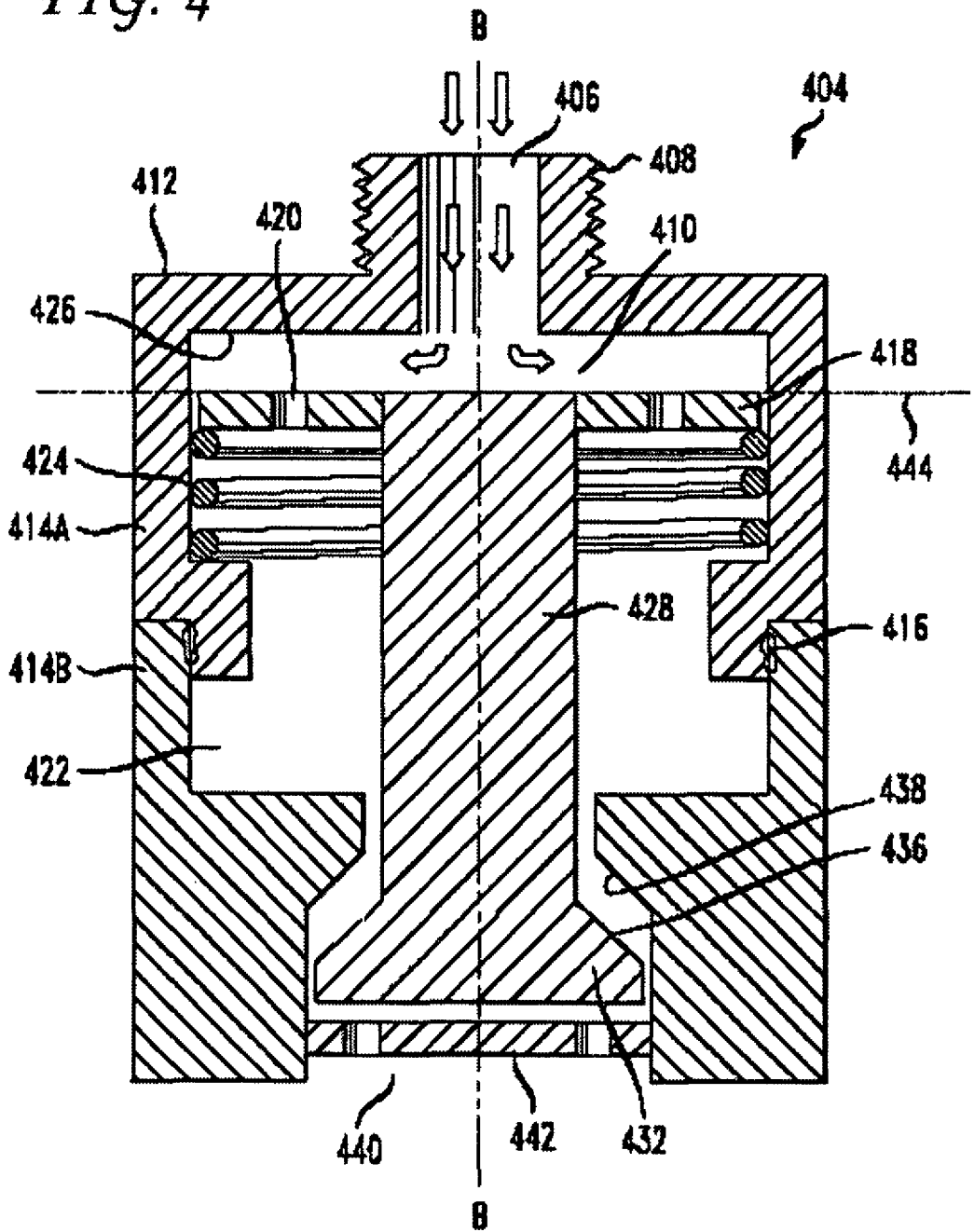
FIG. 4 is a schematic of an exemplary reducing agent delivery valve in the form of a poppet valve in accordance with yet another aspect of the invention.

FIG. 4 is a schematic an exemplary poppet valve assembly (PVA) 404 (corresponding to 204 in FIG. 2), that is mounted on the exhaust carrying structure to deliver a reducing agent (e.g., diesel fuel) into the exhaust stream. PVA 404 comprises an inlet 406 having a threaded portion 408 for attaching the connecting tube 214 (FIG. 2). The inlet 406 receives fuel from the control valve assembly (see FIG. 3). The fuel is delivered to first chamber 410 defined in a housing 412 of the poppet valve assembly 404. In the illustrative embodiment, the housing 412 includes a first portion 414a and second portion 414b that are joined by welding at 416. Seals may be provided in the assembly, but are omitted here for clarity. A moveable valve plate 418 is disposed within housing 412 and includes at least one aperture 420 to enable fluid flow from first chamber 410 to a second chamber 422. Valve plate 418 is normally biased by spring 424 against annular surface 426 bounding first chamber 410. A valve stem 428 is attached at a first end 430 to valve plate 418 and is axially elongated along a central axis B-B to a flared portion 432 at a second end 434. The flared portion has a surface 436 that is normally biased against a complimentary surface 438 that defines a valve seat in housing 412 to block fluid flow through to an outlet end 440 of poppet valve PVA 404. An orifice plate 442 is disposed in the outlet end 440 to provide for a uniform distribution of fuel into the exhaust stream as is well known in the art of fuel injector design. The PVA 404 is mounted on the exhaust carrying structure shown generally by the reference numeral 444, by a clamping assembly (omitted for clarity). In operation, control valve assembly 306 (FIG. 3), under the control of ECU 116/DCU 118, releases a quantity of fuel to PVA 404 via connecting tube 214 (FIG. 2). The fuel under pressure biases the valve plate 418 downwardly against the force of spring 424, thereby enabling a quantity of fuel to flow through aperture(s) 420 into second chamber 422. The movement of valve plate 418 translates the flared portion 432 of valve stem 428 away from surface 438, which permits fuel to flow through the orifice plate 442 and out of the PVA 404 into the exhaust manifold. When the control valve assembly 306 restricts the flow of fuel through the connecting tube 214, the reduced fuel pressure in first chamber 410 is overcome by the force of spring 424 to move the valve plate 418 (and stem 428) upwardly to close off the PVA 404, and the flow of fuel is prevented from entering the exhaust stream.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the method is disclosed herein with respect to tubular components of a fuel injector, the techniques and configurations of the invention may be applied to other tubular components where a hermetic weld is required. It is to be understood that the embodiments shown and described herein are only illustrative of the principles of the present invention and that various modifications may be implemented by those skilled in the art without departing from the scope and spirit of the invention.

What is claimed is:

1. A dosing valve assembly for administering a reducing agent into an exhaust stream from an internal combustion engine upstream of a catalytic converter and a diesel particulate filter, comprising:
   a control valve coupled to a source of reducing agent; and
   a fluid pressure operated delivery valve constructed and arranged for coupling directly to the exhaust stream at a location upstream of the catalytic converter and the diesel particulate filter, the delivery valve having structure movable from a closed position to an open position to enable a reducing agent to be administered into the exhaust stream, the delivery valve including an inlet communicating with an elongated conduit connecting the control valve and delivery valve for fluidly communicating the reducing agent from the control valve to the delivery valve,
   wherein the control valve is coupled to an electronic control unit that signals the control valve to move between an open and closed fluid flow condition in response to feedback of $NO_x$ emissions in the exhaust stream,
   wherein the delivery valve is a poppet valve having a longitudinal axis and comprising a housing; a movable valve plate disposed generally transversely with respect to the longitudinal axis and having an opening therethrough, parallel to and spaced from the longitudinal axis, for the passage of reducing agent; an axially extending valve stem coupled to the valve plate and including a flared portion having a surface disposed at an acute angle with respect to the longitudinal axis, the surface of the flared portion mating with a valve seat surface disposed generally at the same angle as the surface of the flared portion; and a spring for normally biasing the valve plate such that the surface of the flared portion resides against the valve seat surface to prevent reducing agent flow from an outlet of the poppet valve, and
   wherein the spring has a force such that fluid pressure alone biases the valve plate against the force of the spring to such that the surface of the flared portion moves away from the valve seat surface to permit reducing agent flow from the outlet of the poppet valve.

2. The dosing valve assembly recited in claim 1, wherein the delivery valve is a fluid pressure operated poppet valve.

3. The dosing valve assembly recited in claim 1, wherein the elongated conduit is a connecting tube of a length sufficient to mount the control valve away from a high temperature environment proximal to the exhaust stream.

4. The dosing valve assembly recited in claim 1, wherein the control valve is an electronic fuel injector.

5. The dosing valve assembly recited in claim 4, wherein the fuel injector comprises an inlet for coupling to the source of the fuel, electronic means for opening and closing a fluid flow path through the fuel injector, and an outlet for coupling the fuel injector to the elongated conduit.

6. A dosing valve assembly for administering fuel into an exhaust stream from an internal combustion engine upstream of a catalytic converter and a diesel particulate filter, comprising:
- an electronic fuel injector coupled to a source of fuel; and
- a fluid pressure operated poppet valve constructed and arranged for direct coupling to the exhaust stream at a location upstream of a catalytic converter and a diesel particulate filter, the poppet valve having structure movable from a closed position to an open position to enable fuel to be administered into the exhaust stream, the poppet valve including an inlet communicating with an elongated conduit connecting the electronic fuel injector and poppet valve for fluidly communicating fuel from the electronic fuel injector to the poppet valve,
- wherein the fuel injector is coupled to an electronic control unit that signals the fuel injector to move between an open and closed fluid flow condition in response to feedback of $NO_x$ emissions in the exhaust stream,
- wherein the poppet valve has a longitudinal axis and comprises a housing; a movable valve plate disposed generally transversely with respect to the longitudinal axis and having an opening there-through, parallel to and spaced from the longitudinal axis, for the passage of fuel; an axially extending valve stem coupled to the valve plate and including a flared portion having a surface disposed at an acute angle with respect to the longitudinal axis, the surface of the flared portion mating with a valve seat surface disposed generally at the same angle as the surface of the flared portion; and a spring for normally biasing the valve plate such that the surface of the flared portion resides against the valve seat surface to prevent fuel flow from an outlet of the poppet valve, and
- wherein the spring has a force such that fluid pressure alone biases the valve plate against the force of the spring to such that the surface of the flared portion moves away from the valve seat surface to permit reducing agent flow from the outlet of the poppet valve.

7. The dosing valve assembly recited in claim 6, wherein the elongated conduit is a connecting tube of a length sufficient to mount the fuel injector away from a high temperature environment proximal to the exhaust stream.

8. The dosing valve assembly recited in claim 6, wherein the fuel injector comprises an inlet for coupling to the source of fuel, electronic means for opening and closing a fluid flow path through the fuel injector, and an outlet for coupling the fuel injector to the elongated conduit.

9. A dosing valve assembly for administering diesel fuel into an exhaust stream from an internal combustion engine upstream of a catalytic converter and a diesel particulate filter, comprising:
- a control valve coupled to a source of diesel fuel;
- a fluid pressure operated delivery valve constructed and arranged for coupling directly to the exhaust stream, the delivery valve having structure movable from a closed position to an open position to enable diesel fuel to be administered into the exhaust stream upstream of the catalytic converter and diesel particulate filter, the delivery valve including an inlet communicating with an elongated conduit connecting the control valve and delivery valve for fluidly communicating diesel fuel from the control valve to the delivery valve, the elongated conduit displacing the control valve from the fuel delivery valve,
- wherein the control valve is coupled to an electronic control unit that signals the control valve to move between an open and closed fluid flow condition in response to feedback of $NO_x$ emissions in the exhaust stream,
- wherein the delivery valve is a poppet valve having a longitudinal axis and comprising a housing; a movable valve plate disposed generally transversely with respect to the longitudinal axis and having an opening there-through, parallel to and spaced from the longitudinal axis, for the passage of diesel fuel; an axially extending valve stem coupled to the valve plate and including a flared portion having a surface disposed at an acute angle with respect to the longitudinal axis, the surface of the flared portion mating with a valve seat surface disposed generally at the same angle as the surface of the flared portion; and a spring for normally biasing the valve plate such that the surface of the flared portion resides against the valve seat surface to prevent diesel fuel flow from an outlet of the poppet valve, and
- wherein the spring has a force such that fluid pressure alone biases the valve plate against the force of the spring to such that the surface of the flared portion moves away from the valve seat surface to permit reducing agent flow from the outlet of the poppet valve.

10. The dosing valve assembly recited in claim 9, wherein the delivery valve is a fluid pressure operated poppet valve.

11. The dosing valve assembly recited in claim 9, wherein the elongated conduit is a connecting tube of a length sufficient to mount the control valve away from a high temperature environment proximal to the exhaust stream.

12. The dosing valve assembly recited in claim 9, wherein the control valve is an electronic fuel injector.

13. The dosing valve assembly recited in claim 12, wherein the fuel injector comprises an inlet for coupling to the source of diesel fuel, electronic means for opening and closing a fluid flow path through the fuel injector, and an outlet for coupling the fuel injector to the elongated conduit.

* * * * *